United States Patent
Kushibiki (10) Patent No.: US 12,252,129 B2
(45) Date of Patent: Mar. 18, 2025

(54) DRIVING DIAGNOSTIC DEVICE, DRIVING DIAGNOSTIC METHOD, AND STORAGE MEDIUM

(71) Applicant: TOYOTA JIDOSHA KABUSHIKI KAISHA, Aichi-ken (JP)

(72) Inventor: Yukiya Kushibiki, Gifu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 186 days.

(21) Appl. No.: 18/169,213

(22) Filed: Feb. 15, 2023

(65) Prior Publication Data

US 2023/0322230 A1   Oct. 12, 2023

(30) Foreign Application Priority Data

Apr. 12, 2022   (JP) ................. 2022-065904

(51) Int. Cl.
*B60W 30/18* (2012.01)
*B60W 40/08* (2012.01)

(52) U.S. Cl.
CPC ...... *B60W 30/18163* (2013.01); *B60W 40/08* (2013.01); *B60W 2520/14* (2013.01); *B60W 2540/18* (2013.01); *B60W 2556/45* (2020.02)

(58) Field of Classification Search
CPC ........... B60W 30/18163; B60W 40/08; B60W 40/10; B60W 40/112; B60W 50/04; B60W 50/00; B60W 2520/14; B60W 2520/10; B60W 2520/105; B60W 2540/18; B60W 2540/20; B60W 2556/45
USPC ......................................... 701/41, 42, 43, 44
See application file for complete search history.

(56) References Cited

U.S. PATENT DOCUMENTS

| | | | |
|---|---|---|---|
| 11,648,946 B2 * | 5/2023 | Li | B60W 30/18163 |
| | | | 701/41 |
| 2007/0228713 A1 | 10/2007 | Takemura | |

FOREIGN PATENT DOCUMENTS

| | | | |
|---|---|---|---|
| JP | 2002-150472 A | 5/2002 | |
| JP | 2007-276540 A | 10/2007 | |
| JP | 2012118916 A | 6/2012 | |
| JP | 2012-247871 A | 12/2012 | |
| JP | 2014-081947 A | 5/2014 | |
| WO | WO 2021233005 | * 11/2021 | B60W 40/13 |

* cited by examiner

*Primary Examiner* — Hai H Huynh
(74) *Attorney, Agent, or Firm* — HAUPTMAN HAM, LLP (57) ABSTRACT

A driving diagnostic device includes a processor. The processor acquires vehicle operation information including a direction indicator signal indicating an operation of a direction indicator of a vehicle and a yaw rate of the vehicle from a sensor mounted on the vehicle, determines that an event indicates a lane change by the vehicle when the vehicle operation information satisfies a predetermined condition, and performs evaluation of a driving operation of the vehicle during a period of the event.

9 Claims, 6 Drawing Sheets

| AVERAGE VEHICLE SPEED RANGE | STEERING ANGULAR ACCELERATION THIRD RANGE |
|---|---|
| 20 km/h OR MORE AND 30 km/h OR LESS | ±150deg/s² |
| OVER 30 km/h AND 40 km/h OR LESS | ±100deg/s² |
| OVER 40 km/h AND 50 km/h OR LESS | ±60deg/s² |
| OVER 50 km/h AND 60 km/h OR LESS | ±40deg/s² |
| OVER 60 km/h | ±30deg/s² |

DRIVING DIAGNOSTIC DEVICE, DRIVING DIAGNOSTIC METHOD, AND STORAGE MEDIUM

CROSS-REFERENCE TO RELATED APPLICATION

This application claims priority to Japanese Patent Application No. 2022-065904 filed on Apr. 12, 2022, incorporated herein by reference in its entirety.

BACKGROUND

1. Technical Field

The present disclosure relates to a driving diagnostic device, a driving diagnostic method, and a storage medium for diagnosing whether a driver is performing a lane change accompanied by abrupt turning and abrupt acceleration/deceleration.

2. Description of Related Art

Japanese Unexamined Patent Application Publication No. 2012-118916 (JP 2012-118916 A) discloses a lane change diagnostic device that calculates a collision risk when an own vehicle and other vehicles suddenly decelerate when a lane change is performed.

SUMMARY

However, in the related art, since the collision risk of the own vehicle and other vehicles is only calculated, it has not been always possible to evaluate the actual driving of the own vehicle and detect driving that requires caution and that affects safe driving.

An object of the present disclosure is to provide a driving diagnostic device, a driving diagnostic method, and a storage medium that can evaluate the current driving of the own vehicle and detect driving that requires caution and that affects safe driving.

A driving diagnostic device according to claim 1 includes a processor, in which the processor: acquires vehicle operation information including a direction indicator signal indicating an operation of a direction indicator of a vehicle and a yaw rate of the vehicle from a sensor mounted on the vehicle; determines that an event indicates a lane change by the vehicle when the vehicle operation information satisfies a predetermined condition; and performs evaluation of a driving operation of the vehicle during a period of the event.

The driving diagnostic device according to claim 1 acquires the vehicle operation information including the direction indicator signal and the yaw rate of the vehicle, uses the vehicle operation information to detect the event indicating the lane change, and evaluates the driving operation during the event period. That is, according to the driving diagnostic device, the driving operation is evaluated using the vehicle operation information indicating the vehicle operation currently being performed, which is acquired from the sensor connected to the vehicle-mounted device. In this way, it is possible to evaluate the current driving of the own vehicle and detect driving that requires caution and that affects safe driving.

In the driving diagnostic device according to claim 2, in the driving diagnostic device according to claim 1, the predetermined condition is when the direction indicator signal is detected and when the yaw rate is outside a predetermined first range.

According to the driving diagnostic device according to claim 2, an event of performing a change lane can be clearly detected.

The driving diagnostic device according to claim 3, in the driving diagnostic device according to claim 1, the vehicle operation information further includes an acceleration of the vehicle, and the driving operation is evaluated as a lane change that requires caution when the acceleration is outside a predetermined second range.

According to the driving diagnostic device according to claim 3, a vehicle operation that requires caution and that affects safe driving can be detected.

In the driving diagnostic device according to claim 4, in the driving diagnostic device according to claim 1, the vehicle operation information further includes a steering angle, the processor derives a steering angular acceleration indicating an acceleration of the steering angle from the vehicle operation information, and the driving operation is evaluated as a lane change that requires caution when the steering angular acceleration is outside a predetermined third range.

According to the driving diagnostic device according to claim 4, a vehicle operation that requires caution and that affects safe driving can be detected.

In the driving diagnostic device according to claim 5, in the driving diagnostic device according to claim 4, the vehicle operation information further includes an acceleration of the vehicle, and the driving operation is evaluated as a lane change that requires caution when the acceleration is outside a predetermined second range and when the steering angular acceleration is outside the predetermined third range.

According to the driving diagnostic device according to claim 5, vehicle operations that require further caution can be detected.

In the driving diagnostic device according to claim 6, in the driving diagnostic device according to claim 4 or 5, the vehicle operation information further includes a vehicle speed of the vehicle, and the third range is set in accordance with an average value of the vehicle speed.

According to the driving diagnostic device according to claim 6, even when the evaluation fluctuates in accordance with the vehicle speed, a vehicle operation that requires caution and that affects safe driving can be clearly detected.

A driving diagnostic method according to claim 7 includes: acquiring vehicle operation information including a direction indicator signal indicating an operation of a direction indicator of a vehicle and a yaw rate of the vehicle from a sensor mounted on the vehicle; determining that an event indicates a lane change by the vehicle when the vehicle operation information satisfies a predetermined condition; and performing evaluation of a driving operation of the vehicle during a period of the event.

The driving diagnostic method according to claim 7 acquires the vehicle operation information including the direction indicator signal and the yaw rate of the vehicle, uses the vehicle operation information to detect the event indicating the lane change, and evaluates the driving operation during the event period. That is, according to the driving diagnostic method, the driving operation is evaluated using the vehicle operation information indicating the vehicle operation currently being performed, which is acquired from the sensor connected to the vehicle-mounted device. In this way, it is possible to evaluate the current driving of the own vehicle and detect driving that requires caution and that affects safe driving.

A storage medium according to claim 8 stores a driving diagnostic program that causes a computer to execute processes including: acquiring vehicle operation information including a direction indicator signal indicating an operation of a direction indicator of a vehicle and a yaw rate of the vehicle from a sensor mounted on the vehicle; determining that an event indicates a lane change by the vehicle when the vehicle operation information satisfies a predetermined condition; and performing evaluation of a driving operation of the vehicle during a period of the event.

The computer that executes the driving diagnostic program that is stored in the storage medium according to claim 8 acquires the vehicle operation information including the direction indicator signal and the yaw rate of the vehicle, uses the vehicle operation information to detect the event indicating the lane change, and evaluates the driving operation during the event period. That is, according to the computer, the driving operation is evaluated using the vehicle operation information indicating the vehicle operation currently being performed, which is acquired from the sensor connected to the vehicle-mounted device. In this way, it is possible to evaluate the current driving of the own vehicle and detect driving that requires caution and that affects safe driving.

According to the present disclosure, it is possible to evaluate the current driving of the own vehicle and detect driving that requires caution and that affects safe driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A driving diagnostic system including a driving diagnostic device of the present disclosure will be described. A driving diagnostic system is a system that detects an event in which a vehicle changes lanes using information related to vehicle operation (hereinafter referred to as "vehicle operation information") acquired from vehicle-mounted device installed in the vehicle. In addition, the driving diagnostic system uses the vehicle operation information to evaluate the operation of the vehicle when changing lanes.

Overall Structure

Figure 1:
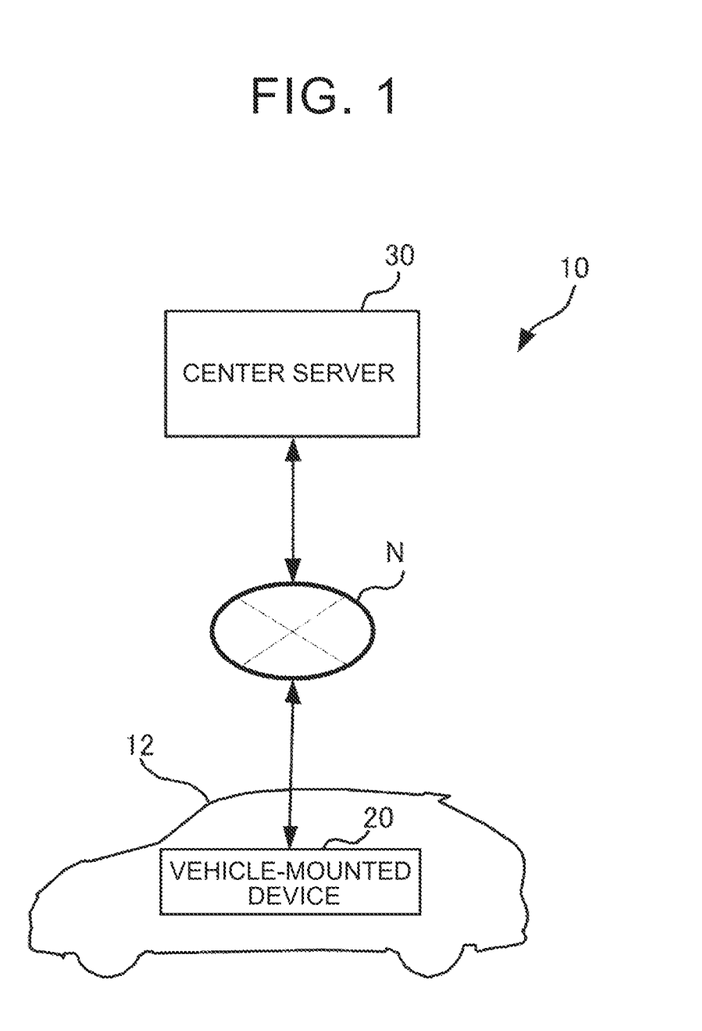
FIG. 1 is a diagram showing a schematic configuration of a driving diagnostic system according to an embodiment.

As shown in FIG. 1, a driving diagnostic system 10 according to an embodiment of the present disclosure includes a vehicle 12, and a center server 30 serving as a driving diagnostic device. A vehicle-mounted device 20 is mounted on the vehicle 12, and the vehicle-mounted device 20 is mutually connected to the center server 30 through a network N.

Although FIG. 1 shows one vehicle 12 including one vehicle-mounted device 20 with respect to one center server 30, the numbers of the vehicles 12, the vehicle-mounted device 20, and the center server 30 are not limited to this.

The vehicle-mounted device 20 is a device that acquires vehicle operation information regarding the operation of the vehicle 12 and transmits the information to the center server 30. Here, the vehicle operation information according to the present embodiment is a feature quantity relating to the driving operation detected from each device mounted on the vehicle 12. For example, the vehicle operation information according to the present embodiment is time-series data related to the operation of the vehicle 12, such as vehicle speed, acceleration, steering angle (steering angle) in steering, vehicle yaw rate, and a signal indicating switching of a direction indicator.

The center server 30 is installed in, for example, a manufacturer that manufactures the vehicle 12 or a car dealer affiliated with the manufacturer. The center server acquires the vehicle operation information from the vehicle-mounted device 20, detects an event indicating a lane change of the vehicle, and evaluates the vehicle operation during an event period. Here, the event period according to this embodiment is, for example, a predetermined period such as 5 seconds.

Vehicle

Figure 2:
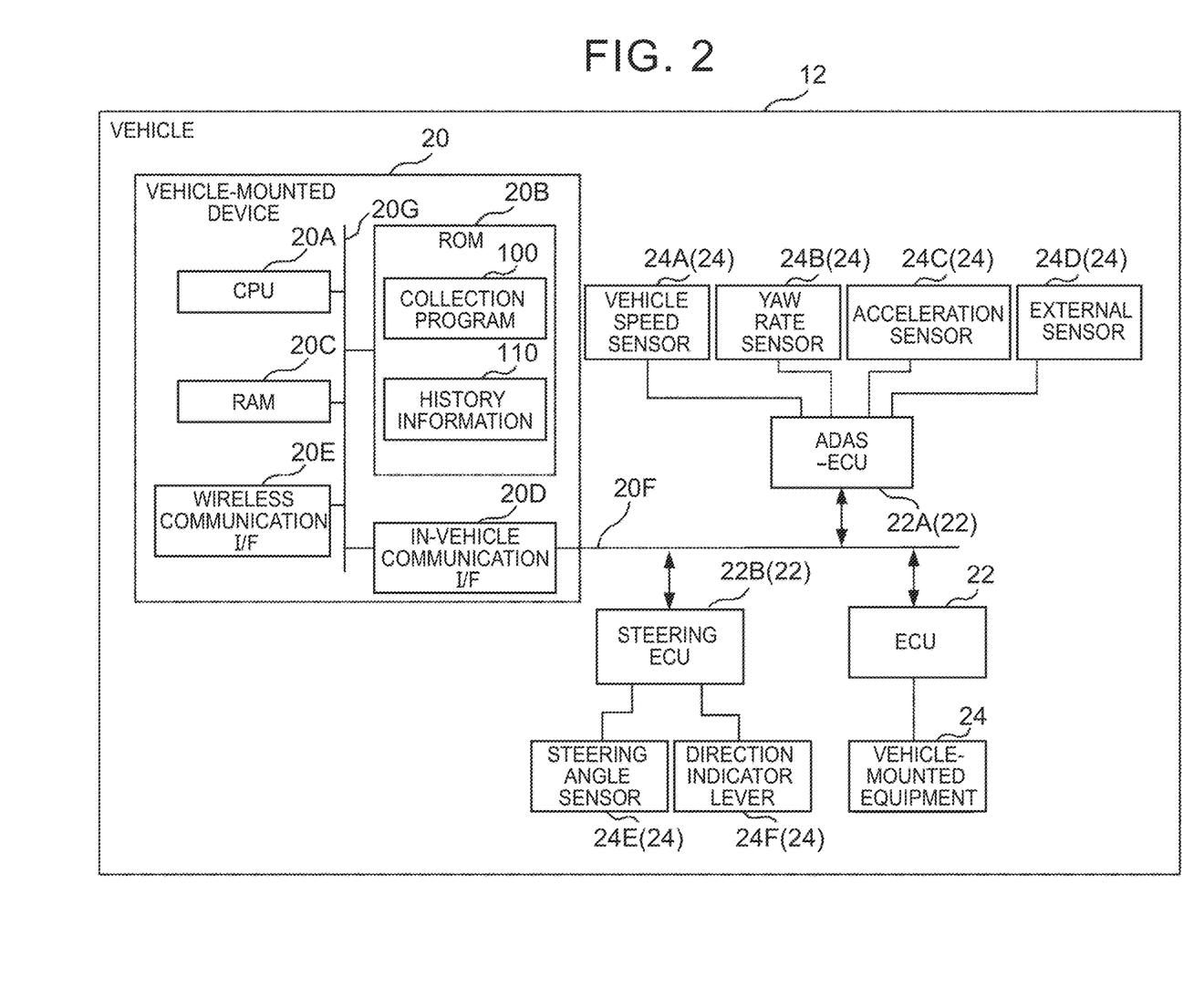
FIG. 2 is a block diagram showing a hardware configuration of a vehicle according to the embodiment.

As shown in FIG. 2, the vehicle 12 according to the present embodiment includes the vehicle-mounted device 20, a plurality of electronic control units (ECUs) 22, and a plurality of vehicle-mounted equipment 24.

The vehicle-mounted device 20 includes a central processing unit (CPU) 20A, a read-only memory (ROM) 20B, a random access memory (RAM) 20C, an in-vehicle communication interface (I/F) 20D, and a wireless communication I/F 20E. The CPU 20A, the ROM 20B, the RAM 20C, the in-vehicle communication I/F 20D, and the wireless communication I/F 20E are connected so as to be able to communicate with each other via an internal bus 20G.

The CPU 20A is a central processing unit that executes various programs and controls various units. That is, the CPU 20A reads the program from the ROM 20B and executes the program using the RAM 20C as a work area.

The ROM 20B stores various programs and various data. The ROM 20B of the present embodiment stores a collection program 100 for collecting the vehicle operation information related to the driving operation of the vehicle 12 from the ECU 22. Along with execution of the collection program 100, the vehicle-mounted device 20 executes processing for transmitting the vehicle operation information to the center server 30. Further, the ROM 20B stores history information 110 that is backup data of the vehicle operation information. The RAM 20C temporarily stores a program or data as a work area.

An in-vehicle communication I/F 20D is an interface for connecting to each of the ECUs 22. For the interface, a communication standard based on a controller area network (CAN) protocol is used. The in-vehicle communication I/F 20D is connected to an external bus 20F.

The wireless communication I/F 20E is a wireless communication module for communicating with the center server 30. For the wireless communication module, for example, communication standards such as fifth generation (5G), long term evolution (LTE), and Wi-Fi (registered trademark) are used. The wireless communication I/F 20E is connected to the network N.

The ECU 22 includes at least an ADAS (Advanced Driver Assistance System)-ECU 22A and a steering ECU 22B.

The ADAS-ECU 22A controls an advanced driver assistance system in an integrated manner. A vehicle speed sensor 24A, a yaw rate sensor 24B, an acceleration sensor 24C, and an external sensor 24D that constitute the vehicle-mounted equipment 24 are connected to the ADAS-ECU 22A. The vehicle speed sensor 24A is a sensor that detects the speed of the vehicle, the yaw rate sensor 24B is a sensor that detects the angular velocity in turning of the vehicle, and the acceleration sensor 24C is a sensor that detects the acceleration in a traveling direction of the vehicle. The external sensor 24D is a group of sensors used for detecting the surrounding environment of the vehicle 12. The external sensor 24D includes, for example, a camera that captures images of surrounding areas of the vehicle 12, a millimeter-wave radar that transmits an exploration wave and receives a reflective wave, a laser imaging detection and ranging (LiDAR) that scans a front area of the vehicle 12, and the like.

The steering ECU 22B controls power steering. The steering ECU 22B is connected to a steering angle sensor 24E and a direction indicator lever 24F that constitute the vehicle-mounted equipment 24. The steering angle sensor 24E is a sensor that detects the steering angle of the steering wheel, and the direction indicator lever 24F is a switch for switching the turn signal.

Figure 3:
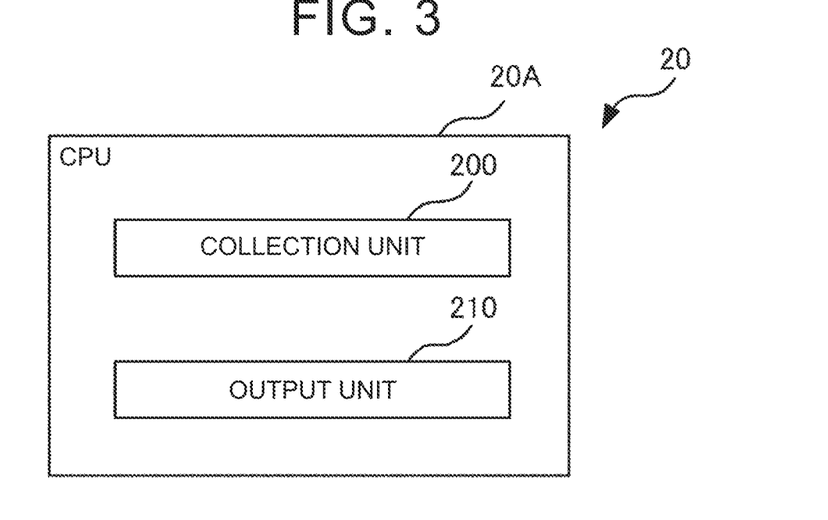
FIG. 3 is a block diagram showing a functional configuration of a vehicle-mounted device according to the embodiment.

As shown in FIG. 3, in the vehicle-mounted device 20 according to the present embodiment, the CPU 20A functions as a collection unit 200 and an output unit 210 by executing the collection program 100.

The collection unit 200 has a function of acquiring information detected by the vehicle-mounted equipment 24 from each ECU 22 of the vehicle 12 and collecting the vehicle operation information.

The output unit 210 has a function of outputting the vehicle operation information collected by the collection unit 200 to the center server 30.

Center Server

Figure 4:
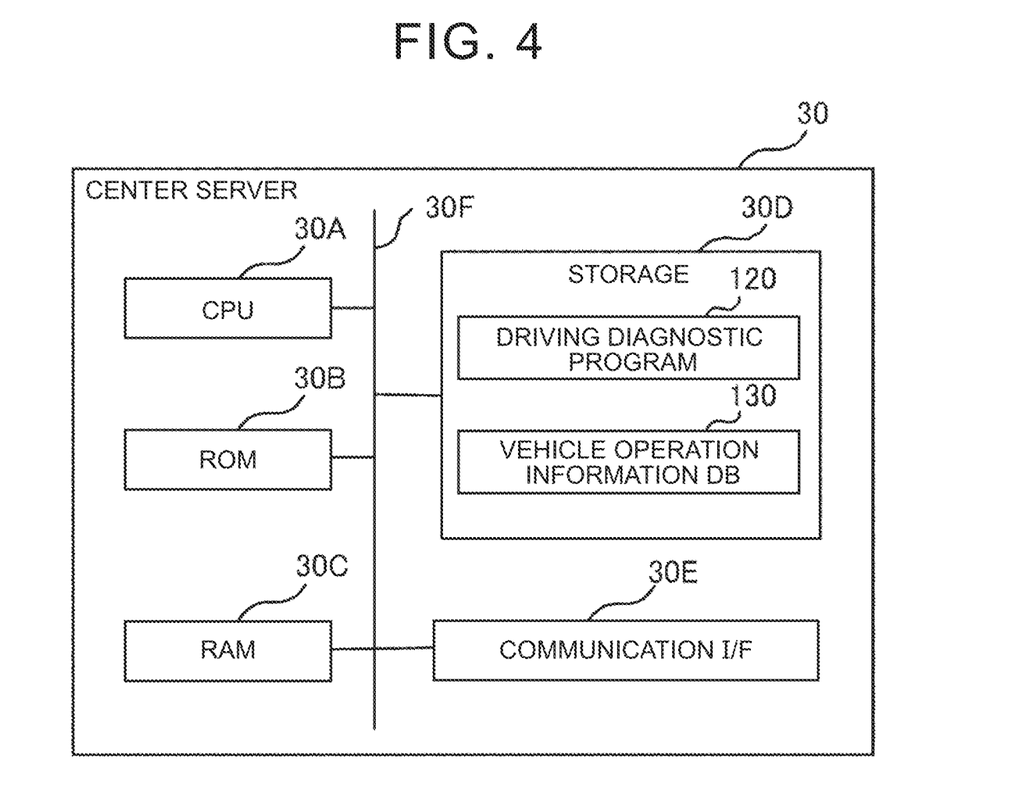
FIG. 4 is a block diagram showing a hardware configuration of a center server according to the embodiment.

As shown in FIG. 4, the center server 30 is configured to include a CPU 30A, a ROM 30B, a RAM 30C, a storage 30D, and a communication I/F 30E. The CPU 30A, the ROM 30B, the RAM 30C, the storage 30D, and the communication I/F 30E are connected so as to be able to communicate with each other via an internal bus 30F. The functions of the CPU 30A, the ROM 30B, the RAM 30C and the communication I/F 30E are the same as those of the CPU 20A, the ROM 20B, the RAM 20C and the wireless communication I/F 20E of the vehicle-mounted device 20 described above. The communication I/F 30E may perform wired communication.

The storage 30D as a memory is composed of a hard disk drive (HDD) or a solid state drive (SSD), and stores various programs and various data. A driving diagnostic program 120 and a vehicle operation information database (hereinafter referred to as a "vehicle operation information DB") 130 are stored in the storage 30D of the present embodiment. The ROM 30B may store the driving diagnostic program 120 and the vehicle operation information DB 130.

The driving diagnostic program 120 serving as a program is a program for controlling the center server 30. In accordance with the execution of the driving diagnostic program 120, the center server 30 executes each process including the process of detecting an event from the vehicle operation information and the process of evaluating the operation of the vehicle.

The vehicle operation information DB 130 stores the vehicle operation information received from the vehicle-mounted device 20 and the evaluation results acquired by using the vehicle operation information.

Figure 5:
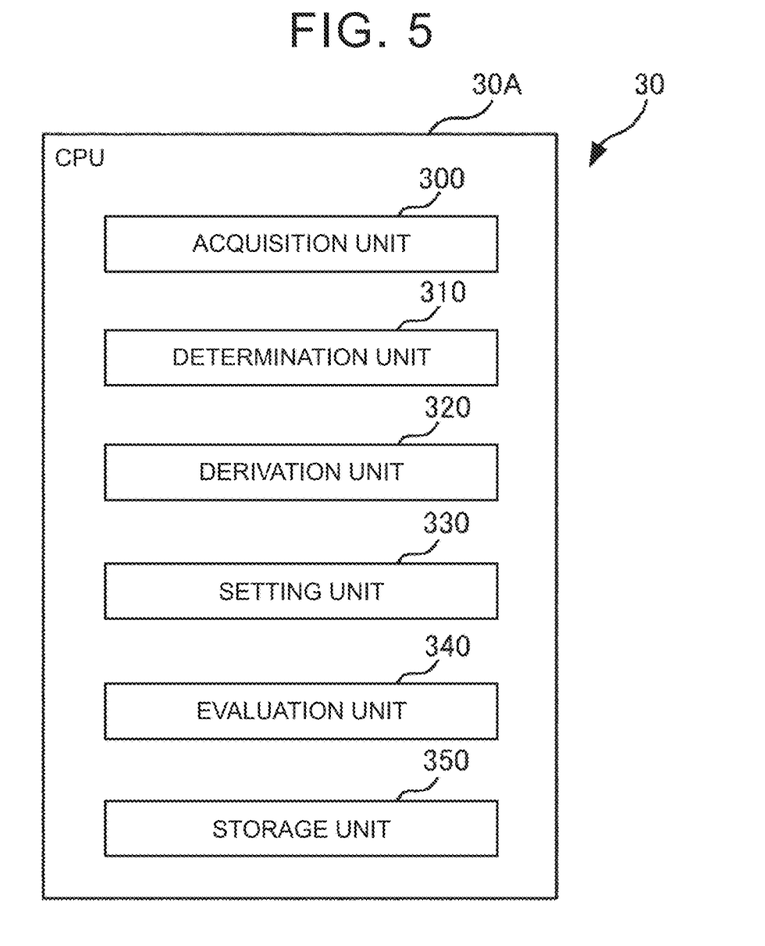
FIG. 5 is a block diagram showing a functional configuration of the center server according to the embodiment.

As shown in FIG. 5, in the center server 30 of the present embodiment, the CPU 30A executes the driving diagnostic program 120 to function as an acquisition unit 300, a determination unit 310, a derivation unit 320, a setting unit 330, an evaluation unit 340, and a storage unit 350.

The acquisition unit 300 has a function of acquiring the vehicle operation information of the vehicle 12 from the vehicle-mounted device 20 of the vehicle 12. Here, the acquisition unit 300 according to the present embodiment acquires the vehicle speed, the acceleration, the yaw rate, the steering angle, and the time-series data relating to the direction indicator signal as the vehicle operation information. The acceleration according to the present embodiment is a positive acceleration that accelerates in the traveling direction and a negative acceleration that decelerates in the traveling direction. Further, regarding the yaw rate according to the present embodiment, a left turning direction is the positive direction, and a right turning direction is the negative direction. Further, regarding the steering angle according to the present embodiment, a direction in which the vehicle turns left is the positive direction, and a direction in which the vehicle turns right is the negative direction.

The determination unit 310 determines whether the vehicle is changing lanes by using the acquired vehicle operation information, and detects an event. Here, the determination unit 310 detects an event using the yaw rate, the vehicle speed, and the direction indicator signal included in the vehicle operation information.

For example, when the yaw rate is outside a predetermined range (first range), the vehicle speed is equal to or higher than a predetermined speed, and the direction indicator signal is ON, the determination unit 310 determines that the lane change is performed, and the event is detected. Here, for example, when the yaw rate is outside the range of −0.8 deg/s to 0.8 deg/s and the vehicle speed is 20 km/h or more, the determination unit 310 determines that the lane is changed.

Figure 6:
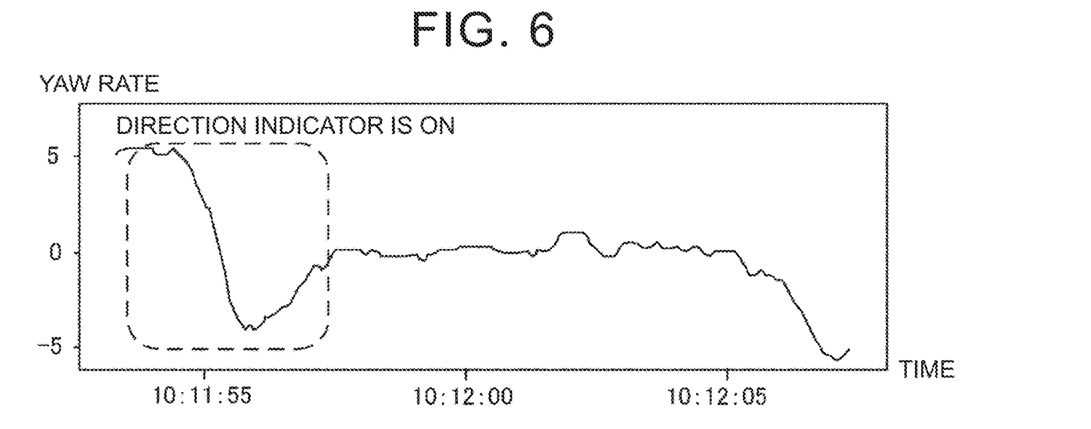
FIG. 6 is a diagram showing an example of yaw rate time-series data for explaining lane change detection according to the embodiment.

Further, the determination unit 310 according to the present embodiment enables lane change determination by detecting a direction indicator. For example, when only the yaw rate of the vehicle is used, the determination unit 310 may detect a lane change even when the vehicle 12 is traveling while turning along the road. However, as shown in FIG. 6 as an example, when the yaw rate is detected and the direction indicator signal is ON, the lane change can be detected with high accuracy.

When an event is detected, the derivation unit 320 uses the vehicle operation information to derive the average vehicle speed, the steering angular acceleration, and the steering angular acceleration threshold of the vehicle during the event period. For example, the derivation unit 320 uses the vehicle speed included in the vehicle operation information to derive the average vehicle speed during the event period, and uses the steering angle included in the vehicle operation information to derive the steering angular acceleration. Here, the steering angular acceleration is derived by second-order differentiation of the time-series data relating to the steering angle.

Figure 7:
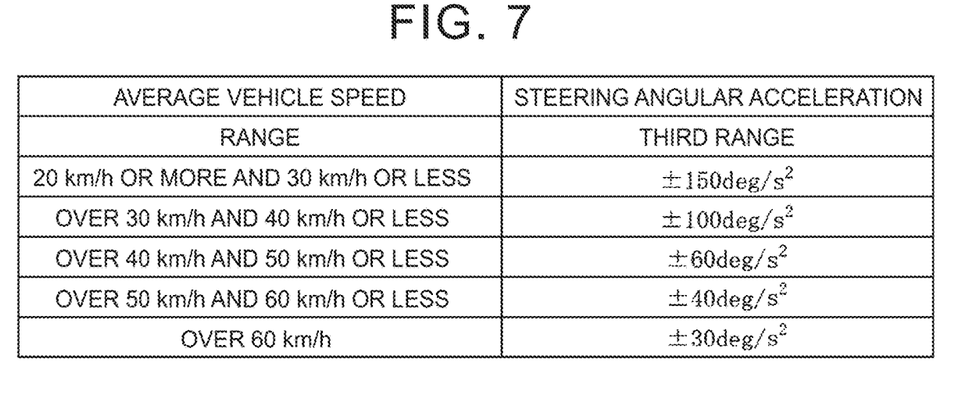
FIG. 7 is a diagram showing an example of a relationship between an average vehicle speed and a steering angular acceleration for explaining derivation of a steering angular acceleration according to the embodiment.

The setting unit 330 sets the threshold range (third range) of the steering angular acceleration according to the derived average vehicle speed. As an example, as shown in FIG. 7, the steering angular acceleration threshold is set such that the third range becomes smaller as the average vehicle speed increases. For example, as shown in FIG. 7, when the average vehicle speed is 20 km/h or more and 30 km/h or less, the setting unit 330 sets the third range from $-150$ $deg/s^2$ to $150$ $deg/s^2$, and when the average vehicle speed exceeds 30 km/h and is 40 km/h or less, the setting unit 330 sets the third range to $-100$ $deg/s^2$ to $100$ $deg/s^2$. When the average vehicle speed is over 40 km/h and 50 km/h or less, the setting unit 330 sets the third range from $-60$ $deg/s^2$ to $60$ $deg/s^2$, and when the average vehicle speed exceeds 50 km/h and is 60 km/h or less, the setting unit 330 sets the third range to $-40$ $deg/s^2$ to $40$ $deg/s^2$. Further, when the average vehicle speed exceeds 60 km/h, the setting unit 330 sets the third range from $-30$ $deg/s^2$ to $30$ $deg/s^2$.

The evaluation unit 340 evaluates the driving operation during the event period. For example, when the acceleration included in the vehicle operation information is outside the predetermined second range, the evaluation unit 340 evaluates that the driving operation requires caution. In addition, when the steering angular acceleration derived from the steering angle included in the vehicle operation information is outside the third range, evaluation unit 340 evaluates the driving operation that requires caution. Here, the second range is, for example, a range from $-2.5$ $m/s^2$ to $2.5$ $m/s^2$.

The storage unit 350 stores the vehicle operation information acquired by the acquisition unit 300 and the evaluation result evaluated by the evaluation unit 340 in the vehicle operation information DB 130.

Flow of Control

Figure 8:
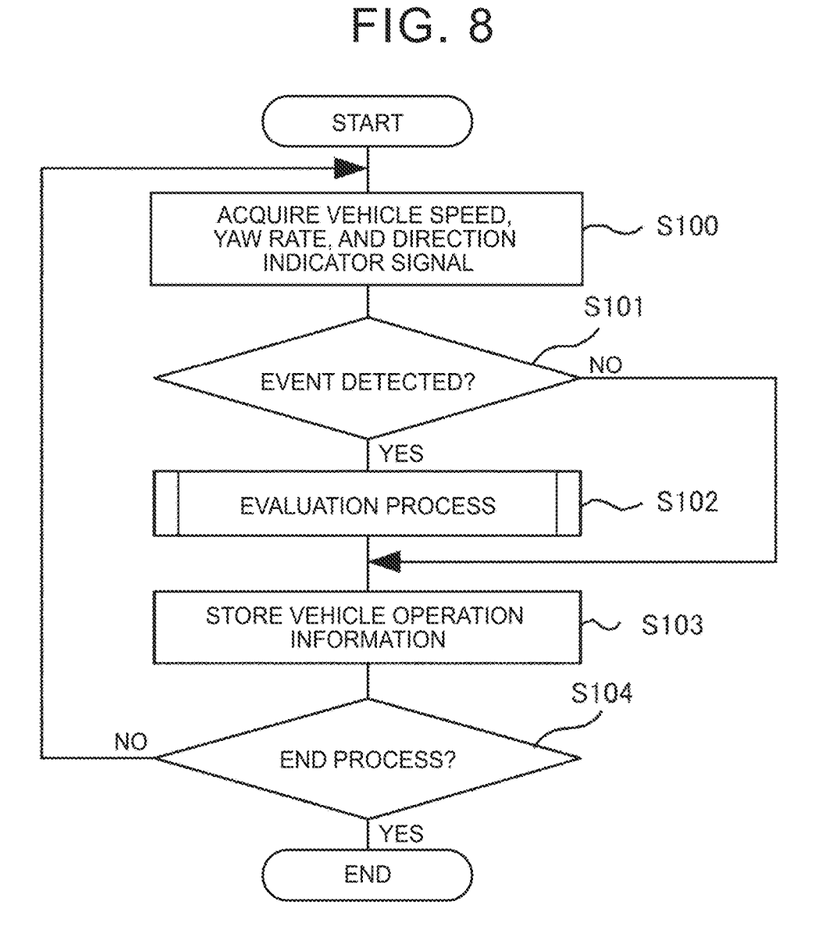
FIG. 8 is a flowchart showing a flow of a driving diagnostic process executed in a center server according to the embodiment.
Figure 9:
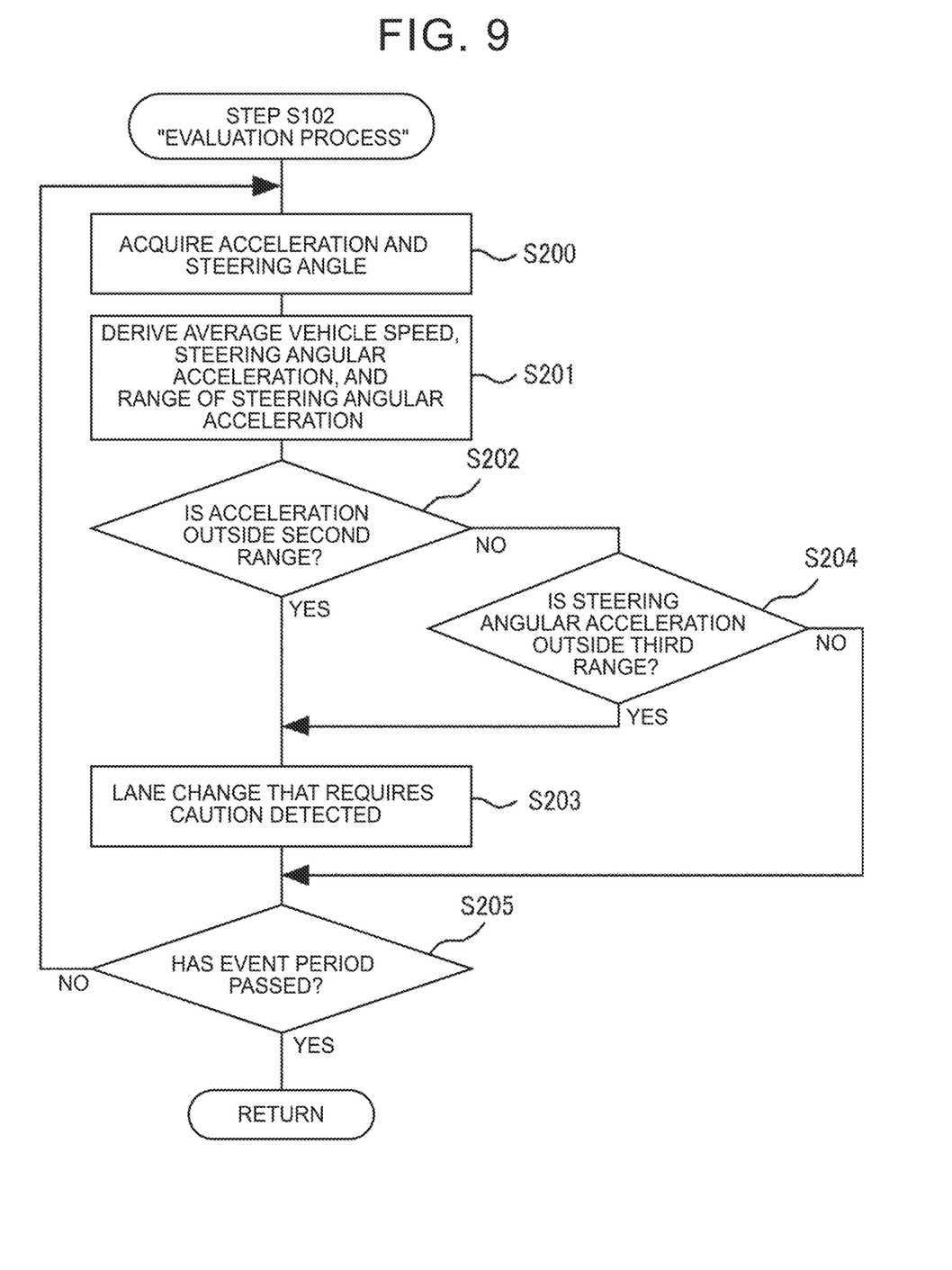
FIG. 9 is a flowchart showing a flow of an evaluation process executed in the center server according to the embodiment.

The flow of each process executed by the driving diagnostic system 10 of the present embodiment will be described with reference to the flowchart of FIGS. 8 and 9. Each process in the center server 30 is executed by the CPU 30A of the center server 30 functioning as the acquisition unit 300, the determination unit 310, the derivation unit 320, the setting unit 330, the evaluation unit 340, and the storage unit 350. The process for detecting an event shown in FIG. 8 is executed, for example, when an instruction to detect an event is input.

In step S100, the CPU 30A acquires the vehicle speed, the yaw rate, and the direction indicator signal as the vehicle operation information.

In step S101, the CPU 30A determines whether an event of lane change is detected by using the vehicle operation information. When an event is detected (step S101: YES), the CPU 30A proceeds to step S102. On the other hand, when no event is detected (step S101: NO), the CPU 30A proceeds to step S103. Here, in the acquired vehicle operation information, when the yaw rate is outside the predetermined first range, the vehicle speed is equal to or higher than the predetermined speed, and the direction indicator signal is ON, the CPU 30A detects the event, on basis that a lane change is taking place.

In step S102, the CPU 30A performs the evaluation process for evaluating the vehicle operation during the event period. The evaluation process will be described in detail with reference to FIG. 9, which will be described later.

In step S103, the CPU 30A stores the vehicle operation information in vehicle operation information DB 130. When the evaluation process is performed, the CPU 30A associates and stores the evaluation result together with the vehicle operation information.

In step S104, the CPU 30A determines whether to end the process of detecting an event. When the process of detecting an event is to be ended (step S104: YES), the CPU 30A ends the process of detecting an event. On the other hand, when the process of detecting an event is not to be ended (step S104: NO), the CPU 30A proceeds to step S100 and acquires the vehicle operation information.

The flow of each process executed by the driving diagnostic system 10 of the present embodiment will be described with reference to the flowchart of FIG. 9. The evaluation process shown in FIG. 9 is executed, for example, when an instruction to execute the process of evaluating the vehicle operation is input.

In step S200, the CPU 30A acquires the vehicle acceleration and the steering angle as the vehicle operation information.

In step S201, the CPU 30A uses the acquired vehicle operation information to derive the average vehicle speed, the steering angular acceleration, and the steering angular acceleration range (third range).

In step S202, the CPU 30A determines whether the acceleration of the vehicle is outside the second range. When the acceleration of the vehicle is outside the second range (step S202: YES), the process proceeds to step S203. On the other hand, when the vehicle acceleration is not outside the second range (the vehicle acceleration is within the second range) (step S202: NO), the CPU 30A proceeds to step S204.

In step S203, the CPU 30A detects a lane change that requires caution as an evaluation of vehicle operation.

In step S204, the CPU 30A determines whether the steering angular acceleration of the vehicle is outside the third range. When the steering angular acceleration of the vehicle is outside the third range (step S204: YES), the process proceeds to step S203. On the other hand, when the steering angular acceleration is not outside the third range (the steering angular acceleration is within the third range) (step S204: NO), the CPU 30A proceeds to step S205.

In step S205, the CPU 30A determines whether the event period has passed. When the event period has passed (step S205: YES), the evaluation process ends. On the other hand, when the event period has not elapsed (it the time is within the event period) (step S205: NO), the CPU 30A proceeds to step S200 and acquires the vehicle operation information.

As described above, according to the present embodiment, it is possible to evaluate the current driving of the own vehicle and detect driving that requires caution and that affects safe driving.

SUMMARY

The center server 30 serving as the driving diagnostic device of the present embodiment acquires the vehicle operation information including the direction indicator signal and the yaw rate of the vehicle, uses the vehicle operation information to detect the event indicating the lane change, and evaluates the driving operation during the event period. That is, according to the driving diagnostic device, the driving operation is evaluated by using the vehicle operation information indicating the vehicle operation currently being performed, which is acquired from the sensor connected to the vehicle-mounted device. In this way, it is possible to evaluate the current driving of the own vehicle and detect driving that requires caution and that affects safe driving.

Remarks

In addition, in the present embodiment, the form in which the center server 30 is equipped with the driving diagnostic device has been described. However, the form is not limited to this. The vehicle-mounted device 20 mounted on the vehicle 12 may be a driving diagnostic device. For example, the vehicle-mounted device 20 may use the vehicle operation information acquired from the vehicle-mounted equipment 24 to detect the lane change and evaluate the vehicle operation, and transmit the evaluation result to the center server 30 or the like.

Moreover, in the present embodiment, a form in which the first range, the second range, and the third range are predetermined is described. However, the form is not limited to this. The first range, the second range, and the third range may be set by the user, or a change by the user may be received.

Further, in the present embodiment, a form has been described in which the lane change event is detected by using the yaw rate, the vehicle speed, and the direction indicator signal. However, the form is not limited to this. The event may be detected using the yaw rate and the direction indicator signal, or the event may be detected by any combination as long as the yaw rate and the direction indicator signal are included.

Further, in the present embodiment, a form has been described in which the event of performing the lane change of the vehicle 12 is detected by using the direction indicator signal. However, the form is not limited to this. For example, an image captured by a camera may be used to detect lane boundary lines displayed on a road, and the event of changing lanes may be detected when the vehicle 12 crosses over the lane boundary line.

Moreover, in the present embodiment, the form in which the vehicle-mounted device 20 collects the vehicle operation information from the vehicle-mounted equipment 24 such as a sensor via the ECU 22 has been described. However, the form is not limited to this. The vehicle-mounted equipment 24 may be connected to the vehicle-mounted device 20, and the vehicle-mounted device 20 may collect the vehicle operation information from the vehicle-mounted equipment 24.

Further, in the present embodiment, described is a form in which the evaluation result evaluated by the evaluation process is stored in the vehicle operation information DB 130 together with the vehicle operation information. However, the form is not limited to this. Depending on the evaluation result, a notification may be sent to the driver who is driving the vehicle. For example, when the center server 30 detects a lane change that requires caution, the center server 30 may transmit a notification that the lane change requires caution to the vehicle-mounted device 20, and the notification may be displayed on a monitor (not shown) connected to the vehicle-mounted device 20.

It should be noted that various processors other than the CPU may execute the various processes that are executed when the CPU 20A and the CPU 30A read the software (program) in the above embodiments. Examples of the processors in this case include a programmable logic device (PLD) such as a field-programmable gate array (FPGA) for which a circuit configuration can be changed after production, a dedicated electric circuit that is a processor having a circuit configuration designed exclusively for executing a specific process, such as an application specific integrated circuit (ASIC), and the like. Further, each process described above may be executed by one of these various processors, or by a combination of two or more processors of the same type or different types (for example, a combination of FPGAs, a combination of a CPU and an FPGA, and the like). Further, the hardware structure of each of the various processors is, more specifically, an electric circuit in which circuit elements such as semiconductor elements are combined.

Further, in the above embodiments, a mode in which each program is stored (installed) in a non-transitory computer-readable recording medium (storage medium) in advance has been described. For example, the collection program 100 in the vehicle-mounted device 20 is stored in advance in the ROM 20B, and the driving diagnostic program 130 in the center server 30 is stored in advance in the storage 30D. However, the present disclosure is not limited to this, and the program may be recorded on a non-transitory recording medium such as a compact disc read-only memory (CD-ROM), a digital versatile disc read-only memory (DVD-ROM), and a universal serial bus (USB) memory to be provided. Further, the program may be downloaded from an external device via a network.

The flow of processes described in the above embodiments is an example, and unnecessary steps may be deleted, new steps may be added, or the process order may be changed within a range that does not deviate from the gist.

What is claimed is:

1. A driving diagnostic device comprising a processor, wherein the processor:
  acquires vehicle operation information including a direction indicator signal indicating an operation of a direction indicator of a vehicle and a yaw rate of the vehicle from a sensor mounted on the vehicle;
  determines that an event indicates a lane change by the vehicle when the vehicle operation information satisfies a predetermined condition; and
  performs evaluation of a driving operation of the vehicle during a period of the event,
  wherein the predetermined condition is when the direction indicator signal is detected and when the yaw rate is outside a predetermined first range,
  the vehicle operation information further includes a steering angle,
  the processor derives a steering angular acceleration indicating an acceleration of the steering angle from the vehicle operation information, and
  the driving operation is evaluated as a lane change that requires caution when the steering angular acceleration is outside a predetermined third range.

2. The driving diagnostic device according to claim 1, wherein the vehicle operation information further includes an acceleration of the vehicle, and
  wherein the driving operation is evaluated as a lane change that requires caution when the acceleration is outside a predetermined second range.

3. The driving diagnostic device according to claim 1, wherein the vehicle operation information further includes an acceleration of the vehicle, and
  wherein the driving operation is evaluated as a lane change that requires caution when the acceleration is outside a predetermined second range and when the steering angular acceleration is outside the predetermined third range.

4. The driving diagnostic device according to claim 1, wherein the vehicle operation information further includes a vehicle speed of the vehicle, and wherein the third range is set in accordance with an average value of the vehicle speed.

5. The driving diagnostic device according to claim 1, further comprising:
a camera configured to capture an image, wherein the processor is configured to:
detect lane boundary lines on a road based on the captured image, and
determine whether the vehicle crosses over the lane boundary line, wherein the predetermined condition is in a case where the processor determines that the vehicle crosses over the lane boundary line.

6. A driving diagnostic method in which a computer executes processes comprising:
acquiring vehicle operation information including a direction indicator signal indicating an operation of a direction indicator of a vehicle and a yaw rate of the vehicle from a sensor mounted on the vehicle;
determining that an event indicates a lane change by the vehicle when the vehicle operation information satisfies a predetermined condition; and
performing evaluation of a driving operation of the vehicle during a period of the event,
wherein the predetermined condition is when the direction indicator signal is detected and when the yaw rate is outside a predetermined first range,
the vehicle operation information further includes a steering angle,
the processor derives a steering angular acceleration indicating an acceleration of the steering angle from the vehicle operation information, and
the driving operation is evaluated as a lane change that requires caution when the steering angular acceleration is outside a predetermined third range.

7. The driving diagnostic method according to claim 6, further comprising:
receiving a captured image from a camera;
detecting lane boundary lines on a road based on the captured image, and
determining whether the vehicle crosses over the lane boundary line, wherein the predetermined condition is in a case where the processor determines that the vehicle crosses over the lane boundary line.

8. A non-transitory storage medium that stores a driving diagnostic program that causes a computer to execute processes comprising:
acquiring vehicle operation information including a direction indicator signal indicating an operation of a direction indicator of a vehicle and a yaw rate of the vehicle from a sensor mounted on the vehicle;
determining that an event indicates a lane change by the vehicle when the vehicle operation information satisfies a predetermined condition; and
performing evaluation of a driving operation of the vehicle during a period of the event,
wherein the predetermined condition is when the direction indicator signal is detected and when the yaw rate is outside a predetermined first range,
the vehicle operation information further includes a steering angle,
the processor derives a steering angular acceleration indicating an acceleration of the steering angle from the vehicle operation information, and
the driving operation is evaluated as a lane change that requires caution when the steering angular acceleration is outside a predetermined third range.

9. The non-transitory computer readable medium according to claim 8, wherein the driving diagnostic program that causes the computer to execute processes further comprising:
receiving a captured image from a camera;
detecting lane boundary lines on a road based on the captured image, and
determining whether the vehicle crosses over the lane boundary line, wherein the predetermined condition is in a case where the processor determines that the vehicle crosses over the lane boundary line.

* * * * *